(12) United States Patent
Parks et al.

(10) Patent No.: US 8,184,187 B2
(45) Date of Patent: May 22, 2012

(54) CONTROLLING ELECTRONIC SHUTTER IN IMAGE SENSORS

(75) Inventors: Christopher Parks, Rochester, NY (US); Gregory O. Moberg, Rochester, NY (US)

(73) Assignee: Truesense Imaging, Inc., Rochester, NY (US)

( * ) Notice: Subject to any disclaimer, the term of this patent is extended or adjusted under 35 U.S.C. 154(b) by 271 days.

(21) Appl. No.: 12/770,826

(22) Filed: Apr. 30, 2010

(65) Prior Publication Data

US 2011/0267518 A1 Nov. 3, 2011

(51) Int. Cl.
*H04N 3/14* (2006.01)
*H04N 5/335* (2006.01)
*H01L 27/00* (2006.01)

(52) U.S. Cl. ............... 348/296; 348/322; 250/208.1
(58) Field of Classification Search ............ 348/296, 348/251, 256, 322
See application file for complete search history.

(56) References Cited

U.S. PATENT DOCUMENTS

| | | | | |
|---|---|---|---|---|
| 6,522,358 B2 * | 2/2003 | Kanbe | | 348/296 |
| 6,821,808 B2 * | 11/2004 | Nakamura et al. | | 438/57 |
| 7,365,773 B2 * | 4/2008 | Takayanagi et al. | | 348/217.1 |
| 7,372,495 B2 * | 5/2008 | Takayanagi et al. | | 348/314 |
| 7,525,588 B2 * | 4/2009 | Takayanagi et al. | | 348/314 |
| 7,817,200 B2 * | 10/2010 | Hirota | | 348/313 |
| 7,880,791 B2 * | 2/2011 | Takayanagi et al. | | 348/317 |
| 7,944,489 B2 * | 5/2011 | Segami et al. | | 348/249 |
| 7,990,451 B2 * | 8/2011 | Belenky et al. | | 348/297 |
| 8,018,514 B1 * | 9/2011 | Baiko et al. | | 348/307 |
| 8,031,252 B2 * | 10/2011 | Segami et al. | | 348/313 |
| 2001/0002847 A1 * | 6/2001 | Kanbe | | 348/296 |
| 2002/0030151 A1 * | 3/2002 | Blaszczynski | | 250/208.1 |
| 2002/0089594 A1 * | 7/2002 | Ishimoto | | 348/296 |
| 2002/0101532 A1 * | 8/2002 | Takayama et al. | | 348/362 |
| 2006/0012697 A1 * | 1/2006 | Boemler | | 348/296 |
| 2008/0079831 A1 * | 4/2008 | Kobayashi et al. | | 348/296 |
| 2008/0225133 A1 * | 9/2008 | Takayanagi et al. | | 348/222.1 |
| 2009/0200455 A1 * | 8/2009 | Takayanagi et al. | | 250/214.1 |
| 2011/0062499 A1 * | 3/2011 | Burke | | 257/223 |
| 2011/0267515 A1 * | 11/2011 | Parks et al. | | 348/296 |
| 2011/0267516 A1 * | 11/2011 | Parks et al. | | 348/296 |
| 2011/0267517 A1 * | 11/2011 | Parks et al. | | 348/296 |

FOREIGN PATENT DOCUMENTS

JP 2011188084 A * 9/2011

* cited by examiner

*Primary Examiner* — John Villecco
(74) *Attorney, Agent, or Firm* — Bingham McCutchen LLP

(57) ABSTRACT

An image sensor includes an electronic shutter layer that drains charge away from the photosensitive regions during an electronic shutter operation. A signal is applied to the electronic shutter layer through a contact. Prior to performing an electronic shutter operation, a determination is made as to whether or not a current level in the electronic shutter layer substantially equals or exceeds a threshold current level. If the current level in the electronic shutter layer substantially equals or exceeds the threshold current level, the electronic shutter operation is not performed. The electronic shutter operation is performed if the current level in the electronic shutter layer does not substantially equal or exceed the threshold current level.

10 Claims, 11 Drawing Sheets

CONTROLLING ELECTRONIC SHUTTER IN IMAGE SENSORS

CROSS-REFERENCE TO RELATED APPLICATIONS

This patent application is related to U.S. application Ser. No. 12/770,806, entitled "Electronic Shutter Control In Image Sensors", filed concurrently herewith; U.S. application Ser. No. 12/770,811, entitled "Electronic Shutter Control In Image Sensors", filed concurrently herewith; and U.S. application Ser. No. 12/770,818, entitled "Electronic Shutter Control In Image Sensors", filed concurrently herewith.

TECHNICAL FIELD

The present invention generally relates to Charge-Coupled Device (CCD) image sensors, and more particularly to interline CCD image sensors with electronic shuttering capability.

BACKGROUND

Photosensitive regions in an image sensor accumulate charge in response to incident light. The amount of time a photosensitive region accumulates charge for an image is known as an integration period. Image sensors control the amount of time in an integration period with a mechanical shutter or by performing an electronic shutter operation. An electronic shutter operation clears charge from the photosensitive regions by draining the charge into an underlying substrate.

A voltage applied to the substrate is set to a first level when the photosensitive regions accumulate charge. When an electronic shutter operation is to be performed, the voltage is changed to a second level. An image sensor, such as an interline charge-coupled device (CCD) image sensor, can be permanently damaged when the image sensor is exposed to extremely bright light during an electronic shutter operation. The damage is caused by a parasitic bipolar transistor formed within the image sensor. FIG. 1 is a schematic of a parasitic bipolar transistor formed in a prior art interline CCD image sensor. An n-type vertical CCD channel can become an emitter of the transistor (Vccd), a grounded p-well under the vertical CCD the base, and an n-type substrate the collector of the transistor (Vsub).

At the center of a pixel array the p-well resistance (represented by R in FIG. 1) is very large because the ground contacts are at the edges of the pixel array. This large resistance allows the bright light to generate photocurrent at the base of the transistor faster than the resistor R can drain it away. A bright spot from the sun, for example, can raise the voltage of the base high enough to turn on the transistor and short the electronic shutter voltage to the vertical CCD channel. The high voltage on the vertical CCD channel will inject charge into the vertical CCD gate dielectric. The injected charge first causes increased dark current in the vertical CCD. With continued bright light exposure during multiple electronic shutter pulses, a sufficient amount of charge is injected into the gate dielectric to cause poor charge transfer and image lag.

SUMMARY

An image sensor includes an electronic shutter layer that drains charge away from the photosensitive regions during an electronic shutter operation. A signal is applied to the electronic shutter layer through a contact. Prior to performing an electronic shutter operation, a determination is made as to whether or not a current level in the electronic shutter layer substantially equals or exceeds a threshold current level. If the current level in the electronic shutter layer substantially equals or exceeds the threshold current level, the electronic shutter operation is not performed. The electronic shutter operation is performed if the current level in the electronic shutter layer does not substantially equal or exceed the threshold current level.

BRIEF DESCRIPTION OF THE DRAWINGS

Embodiments of the invention are better understood with reference to the following drawings. The elements of the drawings are not necessarily to scale relative to each other.

DETAILED DESCRIPTION

Figure 1:
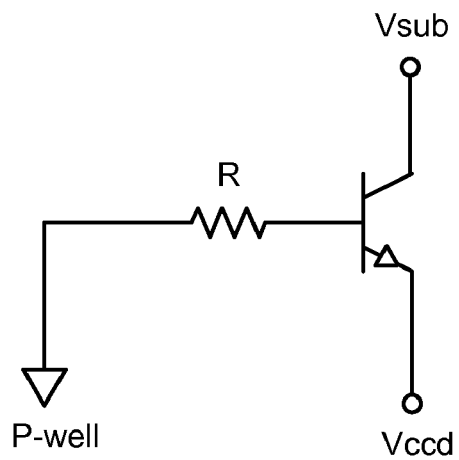
FIG. 1 is a schematic of a parasitic bipolar transistor formed in a prior art interline CCD image sensor.

Throughout the specification and claims, the following terms take the meanings explicitly associated herein, unless the context clearly dictates otherwise. The meaning of "a," "an," and "the" includes plural reference, the meaning of "in"

includes "in" and "on." The term "connected" means either a direct electrical connection between the items connected or an indirect connection through one or more passive or active intermediary devices. The term "circuit" means either a single component or a multiplicity of components, either active or passive, that are connected together to provide a desired function. The term "signal" means at least one current, voltage, charge, or data signal.

Additionally, directional terms such as "on", "over", "top", "bottom", are used with reference to the orientation of the Figure(s) being described. Because components of embodiments of the present invention can be positioned in a number of different orientations, the directional terminology is used for purposes of illustration only and is in no way limiting. When used in conjunction with layers of an image sensor wafer or corresponding image sensor, the directional terminology is intended to be construed broadly, and therefore should not be interpreted to preclude the presence of one or more intervening layers or other intervening image sensor features or elements. Thus, a given layer that is described herein as being formed on or formed over another layer may be separated from the latter layer by one or more additional layers.

The terms "substrate" is to be understood as a semiconductor-based material including, but not limited to, silicon, silicon-on-insulator (SOI) technology, silicon-on-sapphire (SOS) technology, bulk semiconductor substrates, doped and undoped semiconductors, epitaxial layers, buried layers, and well regions formed in or on a semiconductor substrate, and other semiconductor structures.

And finally, the term "electronic shutter layer" is to be understood as a semiconductor-based material that is used to drain charge away from photosensitive regions during an electronic shutter operation.

Referring to the drawings, like numbers indicate like parts throughout the views.

Figure 2:
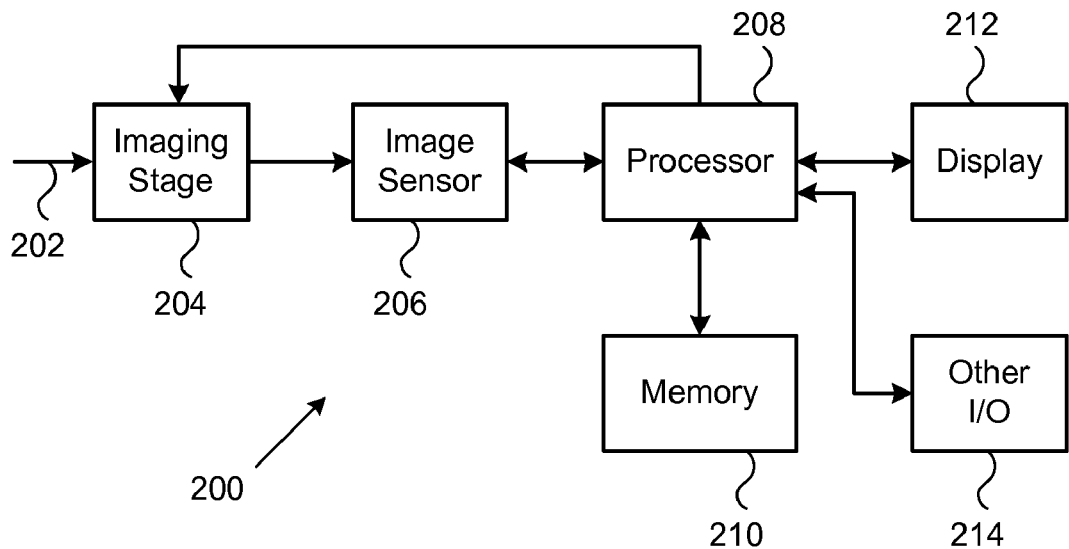
FIG. 2 is a simplified block diagram of an image capture device in an embodiment in accordance with the invention.

FIG. 2 is a simplified block diagram of an image capture device in an embodiment in accordance with the invention. Image capture device 200 is implemented as a digital camera in FIG. 2. Those skilled in the art will recognize that a digital camera is only one example of an image capture device that can utilize an image sensor incorporating the present invention. Other types of image capture devices, such as, for example, cell phone cameras, scanners, and digital video camcorders, can be used with the present invention.

In digital camera 200, light 202 from a subject scene is input to an imaging stage 204. Imaging stage 204 can include conventional elements such as a lens, a neutral density filter, an iris and a shutter. Light 202 is focused by imaging stage 204 to form an image on image sensor 206. Image sensor 206 captures one or more images by converting the incident light into electrical signals. Digital camera 200 further includes processor 208, memory 210, display 212, and one or more additional input/output (I/O) elements 214. Although shown as separate elements in the embodiment of FIG. 2, imaging stage 204 may be integrated with image sensor 206, and possibly one or more additional elements of digital camera 200, to form a camera module. For example, a processor or a memory may be integrated with image sensor 206 in a camera module in embodiments in accordance with the invention.

Processor 208 may be implemented, for example, as a microprocessor, a central processing unit (CPU), an application-specific integrated circuit (ASIC), a digital signal processor (DSP), or other processing device, or combinations of multiple such devices. Various elements of imaging stage 204 and image sensor 206 may be controlled by timing signals or other signals supplied from processor 208.

Memory 210 may be configured as any type of memory, such as, for example, random access memory (RAM), read-only memory (ROM), Flash memory, disk-based memory, removable memory, or other types of storage elements, in any combination. A given image captured by image sensor 206 may be stored by processor 208 in memory 210 and presented on display 212. Display 212 is typically an active matrix color liquid crystal display (LCD), although other types of displays may be used. The additional I/O elements 214 may include, for example, various on-screen controls, buttons or other user interfaces, network interfaces, or memory card interfaces.

It is to be appreciated that the digital camera shown in FIG. 2 may comprise additional or alternative elements of a type known to those skilled in the art. Elements not specifically shown or described herein may be selected from those known in the art. As noted previously, the present invention may be implemented in a wide variety of image capture devices. Also, certain aspects of the embodiments described herein may be implemented at least in part in the form of software executed by one or more processing elements of an image capture device. Such software can be implemented in a straightforward manner given the teachings provided herein, as will be appreciated by those skilled in the art.

Figure 3:
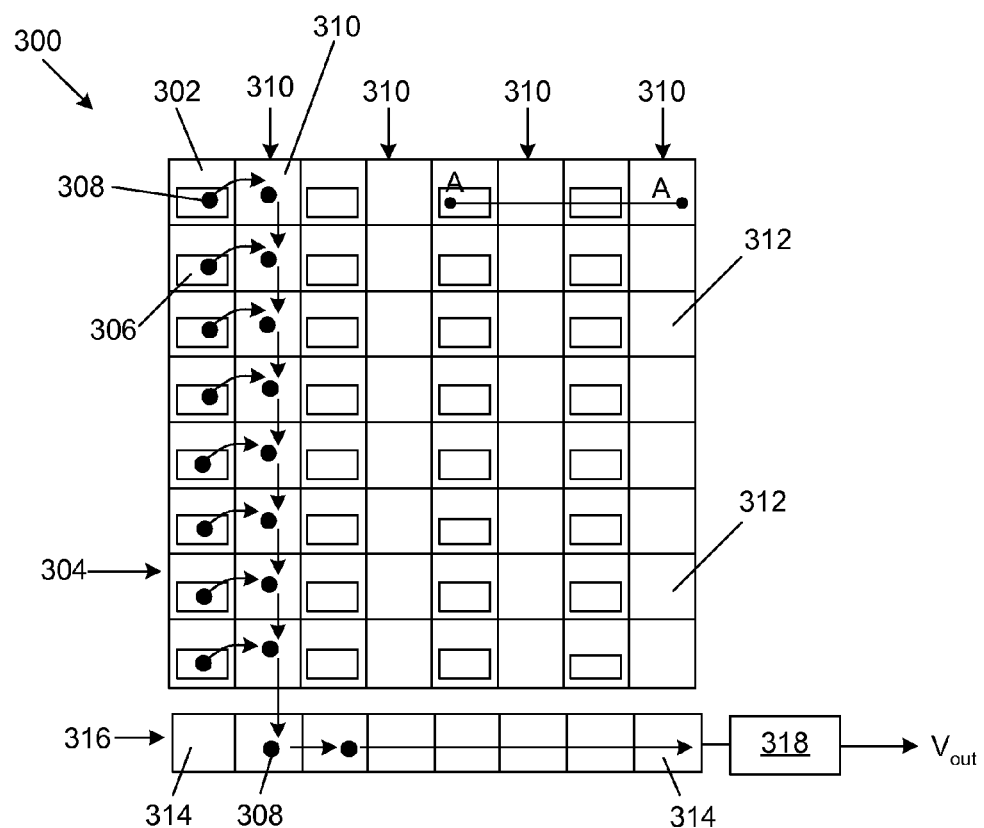
FIG. 3 is a block diagram of a top view of an image sensor suitable for use as image sensor 206 in an embodiment in accordance with the invention.

Referring now to FIG. 3, there is shown a top view of an image sensor suitable for use as image sensor 206 in an embodiment in accordance with the invention. Image sensor 300 is implemented as an interline Charge-Coupled Device (CCD) image sensor in the FIG. 3 embodiment. Image sensor 300 includes a number of pixels 302 typically arranged in rows and columns that form imaging area 304. Each pixel includes a photosensitive region 306 that collects charge carriers 308 in response to incident light. A vertical CCD shift register 310 is positioned adjacent to each column of pixels.

To read out an image captured by the image sensor, appropriate bias signals are generated by a timing generator (not shown in FIG. 3) and applied to transfer regions or gates (not shown) disposed between the photosensitive regions 306 and respective shift elements 312 in the vertical CCD shift registers 310. The charge 308 in all of the vertical CCD shift registers 310 is then shifted in parallel one row at a time into shift elements 314 in horizontal CCD shift register 316. Each row of charge is then shifted serially one shift element 314 at a time through horizontal CCD shift register 316 to output circuit 318. Output circuit 318 includes an amplifier (not shown) in an embodiment in accordance with the invention.

Figure 4:
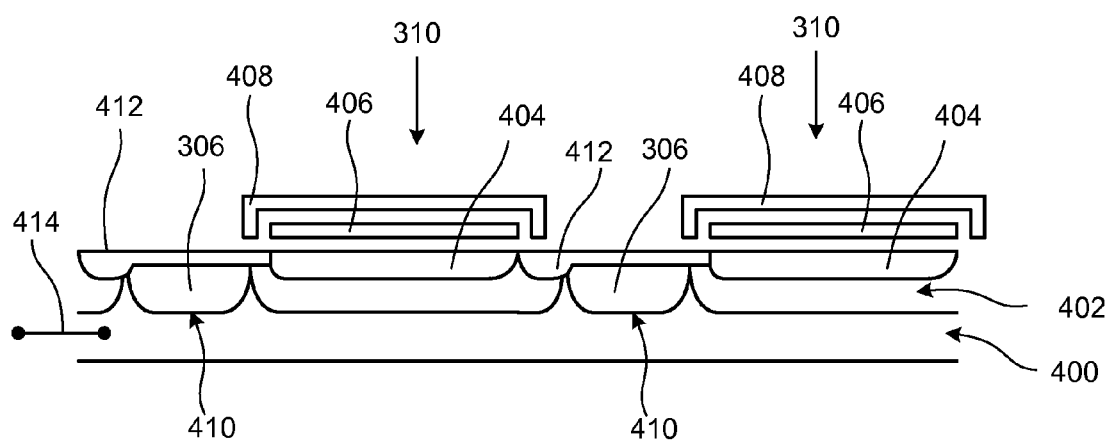
FIG. 4 illustrates a first exemplary cross-sectional view along line A-A shown in FIG. 3 in an embodiment in accordance with the invention.
Figure 5:
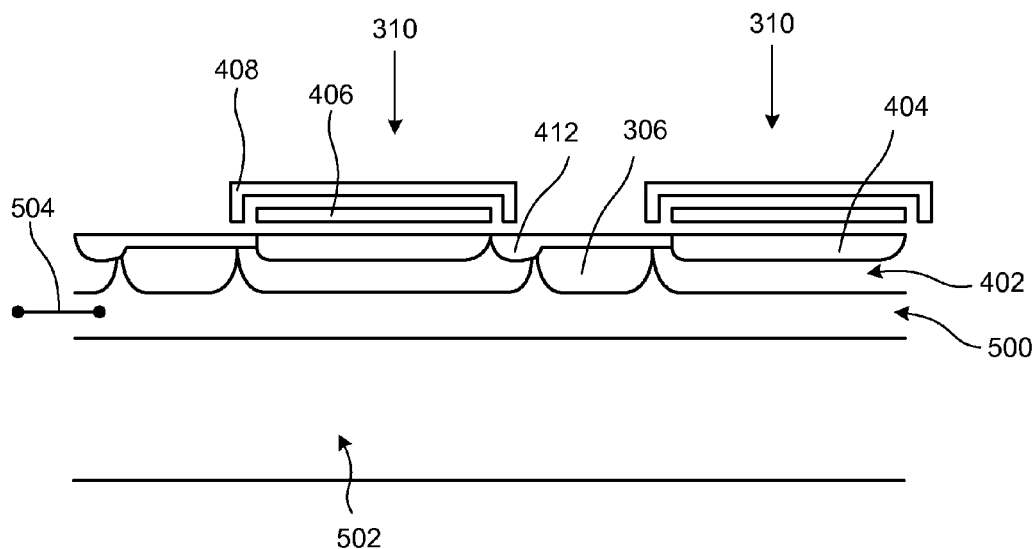
FIG. 5 depicts a second exemplary cross-sectional view along line A-A shown in FIG. 3 in an embodiment in accordance with the invention.

FIGS. 4 and 5 illustrate exemplary cross-sectional views along line A-A shown in FIG. 3 in embodiments in accordance with the invention. The cross-section view extends horizontally through two pixels 302 and two vertical CCD shift registers 310. The exemplary embodiments shown in FIGS. 4 and 5 are described with specific conductivity types. Those skilled in the art will recognize that different conductivity types can be used in other embodiments in accordance with the invention.

In the FIG. 4 embodiment, the entire structure is built on an n-type silicon substrate 400 that functions as the electronic shutter layer. A p-type well 402 is formed in the substrate 400 to isolate substrate 400 from an n-type channel 404 in the vertical CCD 310. The flow of charge through channel 404 is controlled by gates 406. Gates 406 are formed with polysilicon in an embodiment in accordance with the invention.

Channel 404 in vertical CCD 310 is also covered by an opaque light shield 408 to prevent the photo-generation of charge directly in channel 404. Openings in the light shield 408 allow light to penetrate the silicon surface and generate charge in n-type photosensitive region 306. Photosensitive region 306 is separated from substrate 400 by a lightly doped p-type vertical overflow drain 410.

The surface potential of photosensitive region 306 is held at a known potential, such as zero volts, by p+pinning layer 412. Pinning layer 412 also acts as a separator between photosensitive region 306 and channel 404.

Contact 414 allows a signal to be applied to substrate 400. During an electronic shutter operation, the signal level of a shutter signal applied to contact 414 is increased so that unwanted charge in photosensitive regions 306 drains into substrate 400.

Referring now to FIG. 5, there is shown a second exemplary cross-sectional view along line A-A shown in FIG. 3 in an embodiment in accordance with the invention. The structure of FIG. 5 is similar to the structure of FIG. 4, except for n-type buried layer 500 formed in p-type substrate 502. Buried layer 500 acts as the electronic shutter layer in the illustrated embodiment. Contact 504 allows a signal to be applied to buried layer 500. During an electronic shutter operation, the signal level of a shutter signal applied to contact 504 is increased so that unwanted charge in photosensitive regions 306 drains into buried layer 500.

In the embodiments shown in FIGS. 4 and 5, the electronic shutter layer is the n-type substrate 400 and the n-type buried layer 502, respectively. With an n-type semiconductor material, the signal level of the shutter signal is increased during an electronic shutter operation. Those skilled in the art will recognize that the signal level of the shutter signal decreases when a p-type semiconductor material is used as electronic shutter layer.

Figure 6:
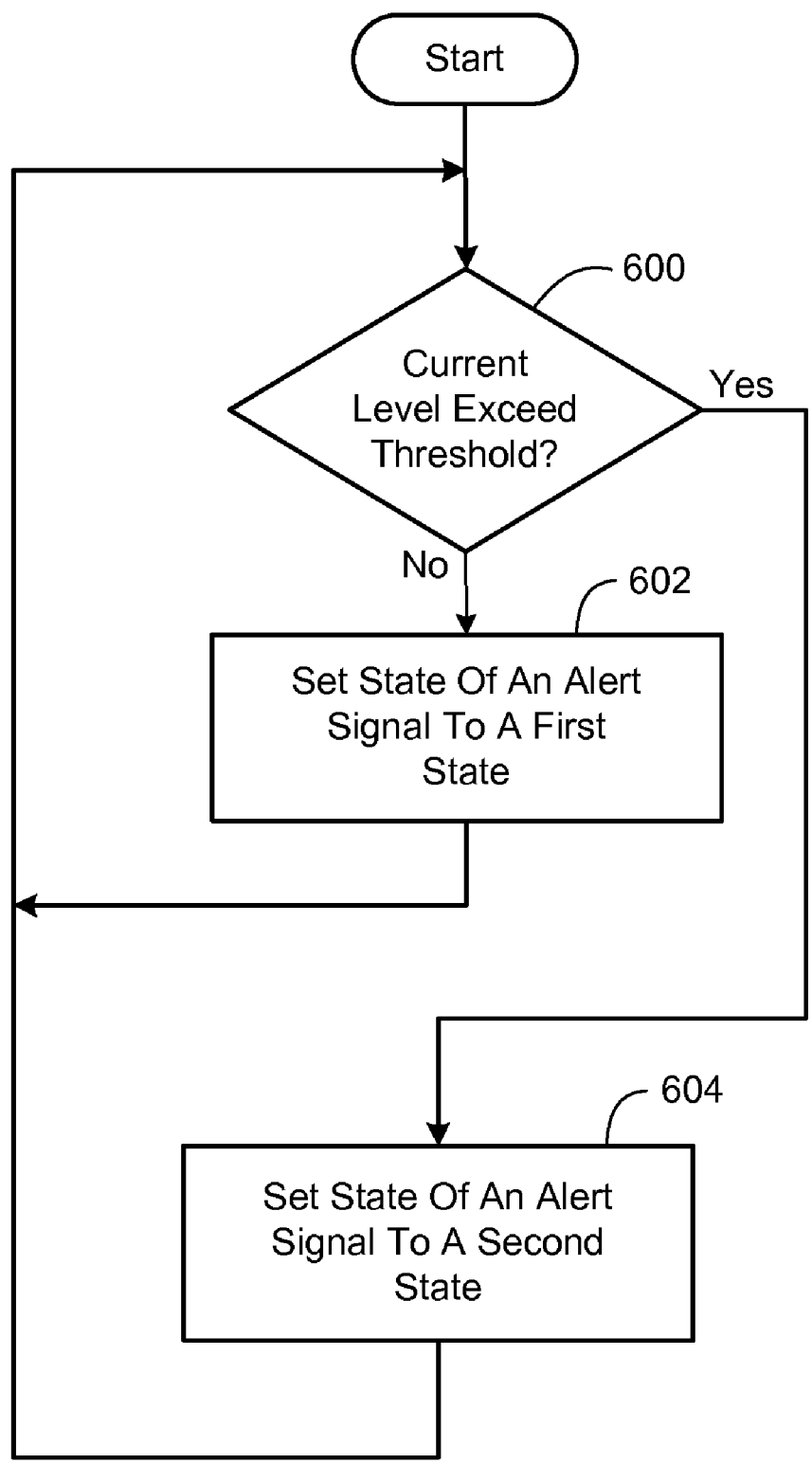
FIG. 6 is a flowchart of a method for sensing current in an electronic shutter layer in an embodiment in accordance with the invention.
Figure 7:
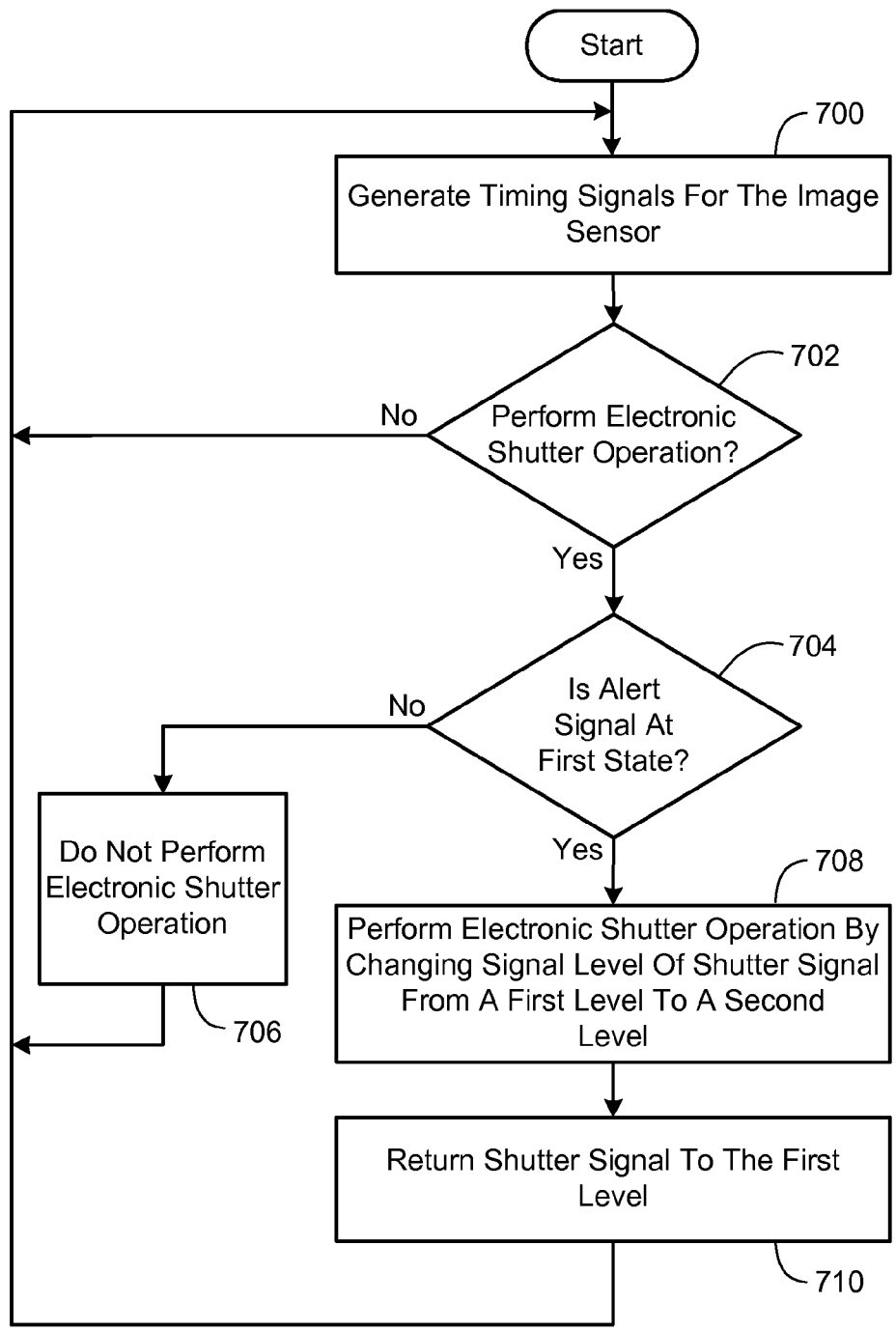
FIG. 7 is a flowchart of a method for performing an electronic shutter operation in an embodiment in accordance with the invention.

The methods depicted in FIGS. 6 and 7 operate concurrently in an embodiment in accordance with the invention. FIG. 6 is a flowchart of a method for sensing current in an electronic shutter layer in an embodiment in accordance with the invention. Initially, a determination is made at block 600 as to whether or not a current level in the electronic shutter layer equals or exceeds a threshold current level. If the current level does not equal, or does not exceed, the threshold current level, the state of an alert signal is changed or set to a first level (block 602). If the current level does equal, or does exceed, the threshold current level, the state of the alert signal is changed or set to a second level (block 604). The process then returns to block 600. The method of FIG. 6 operates continuously in an embodiment in accordance with the invention.

FIG. 7 is a flowchart of a method for performing an electronic shutter operation in an embodiment in accordance with the invention. Initially, the timing generator component produces timing signals for the image sensor (block 700). Examples of the timing signals include, but are not limited to, the timing signals to control the vertical and horizontal CCD shift register operations.

A determination is then made at block 702 as to whether or not an electronic shutter operation is to be performed. If an electronic shutter operation is to be performed, a determination is made at block 704 as to whether or not the state of the alert signal is at the first state. If the state of the alert signal is not at the first state, the electronic shutter operation is not performed (block 706) and the method returns to block 700.

If the state of the alert signal is at the first state, the process continues at block 708 where an electronic shutter operation is performed by changing the signal level of a shutter signal from a first level to a second level. When the electronic shutter operation is complete, the signal level of the shutter signal is returned, or changed, to the first level (block 710). The method then returns to block 700.

When an n-type semiconductor material is used as the electronic shutter layer, the signal level of the shutter signal is increased at block 708 and decreased at block 710. Thus, the second level of the shutter signal is greater than the first level with an n-type electronic shutter layer. Those skilled in the art will recognize that the signal level of the shutter signal can decrease at block 708 and increase at block 710 during an electronic shutter operation when a p-type semiconductor material is used as the electronic shutter layer.

Figure 8:
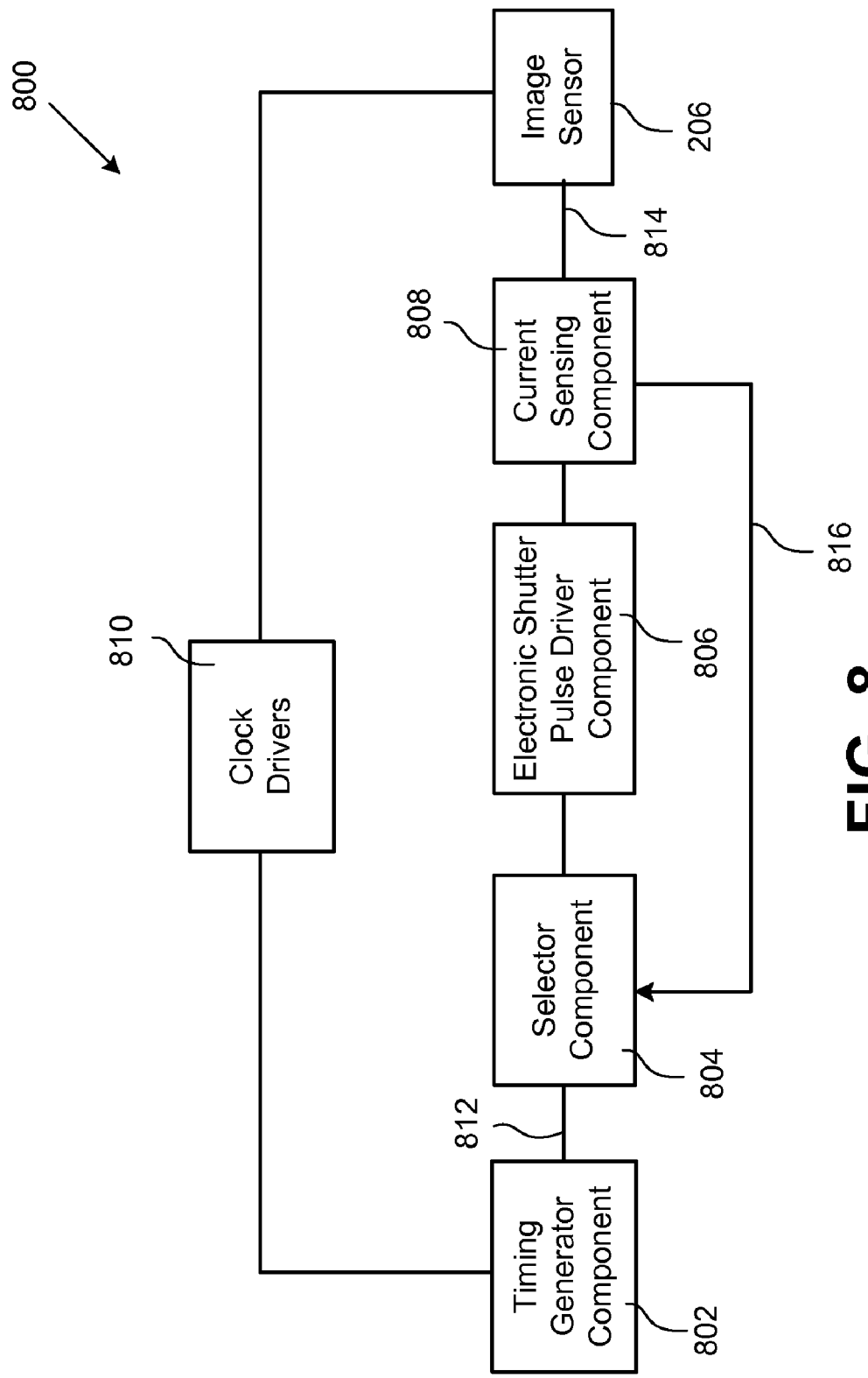
FIG. 8 is a block diagram of a first control circuit suitable for use with image sensor 206 in an embodiment in accordance with the invention.

Referring now to FIG. 8, there is shown a block diagram of a first control circuit suitable for use with image sensor 206 in an embodiment in accordance with the invention. Control circuit 800 includes timing generator component 802, selector component 804, electronic shutter pulse driver component 806, and current sensing component 808. Timing generator component 802 produces timing signals for the image sensor 206. For example, timing generator component 802 generates timing signals that control the state of vertical and horizontal CCD clock drivers 810 connected to image sensor 206.

Timing generator component 802 also produces a drive pulse signal on line 812 when an electronic shutter operation is to be performed in image sensor 206. The drive pulse signal, when received by electronic shutter pulse driver component 806, causes electronic shutter pulse driver component 806 to change the signal level of a shutter signal from a first level to a second level. Electronic shutter pulse driver component 806 produces the first signal level for the shutter signal on line 814 when the photosensitive regions in image sensor 206 accumulate charge. When an electronic shutter operation is to be performed, electronic shutter pulse driver component 806 responsively outputs a different second level for the shutter signal on line 814. By way of example only, in an embodiment using an n-type semiconductor material as the electronic shutter layer, the first signal level is between three and twelve volts and the second signal level is between twenty and thirty volts.

Current sensing component 808 senses a current level in the electronic shutter layer in image sensor on line 814. If image sensor 206 is exposed to damaging bright light, a large photocurrent can be present on line 814. When the current on line 814 equals or exceeds a threshold current level, current sensing component 808 changes a state of an alert signal on line 816.

Selector component 804 receives the alert signal and the drive pulse signal produced by timing generator component 802. Selector component 804 does not transmit the drive pulse signal to electronic shutter pulse driver component 806 when the alert signal is at the second state. An electronic shutter operation is not performed when electronic shutter pulse driver component 806 does not receive the drive pulse signal. The signal level of the shutter signal remains at the first signal level when electronic shutter pulse driver component 806 does not receive the drive pulse signal. The signal level of the shutter signal remains at the first signal level when the current level in the electronic shutter layer in image sensor 206 equals or exceeds the threshold current level.

As discussed earlier, current sensing component 808 sets or changes the state of the alert signal to the first state when the current on line 814 does not equal, or does not exceed the threshold current level. Selector component 806 transmits the drive pulse signal to electronic shutter pulse driver component 806 when the alert signal is at the first state. An electronic shutter operation is performed when electronic shutter pulse driver component 806 receives the drive pulse signal.

Figure 11:
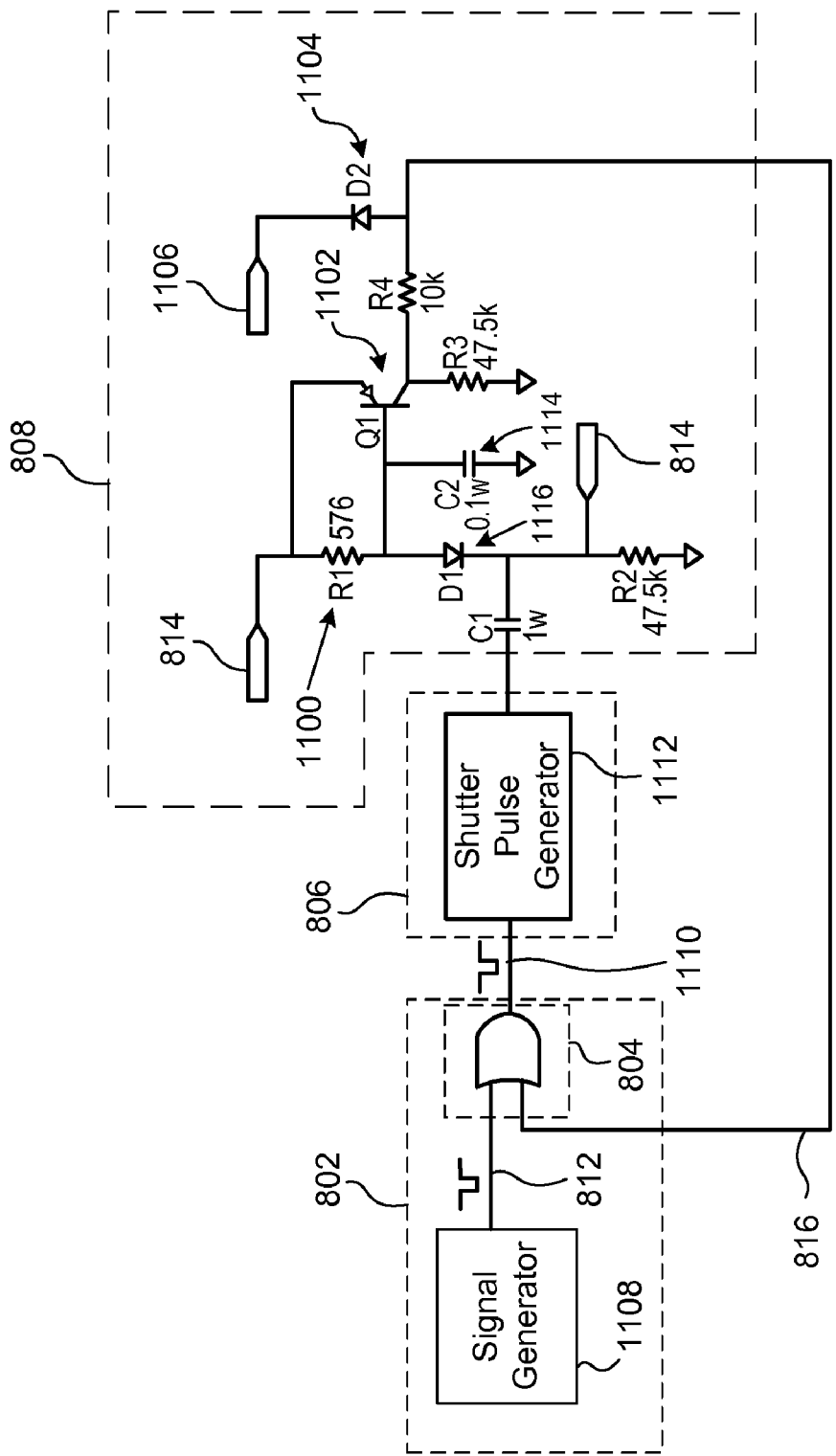
FIG. 11 is a first exemplary block and circuit diagram of blocks 802, 804, 806, and 808 shown in FIG. 8 in an embodiment in accordance with the invention.
Figure 12:
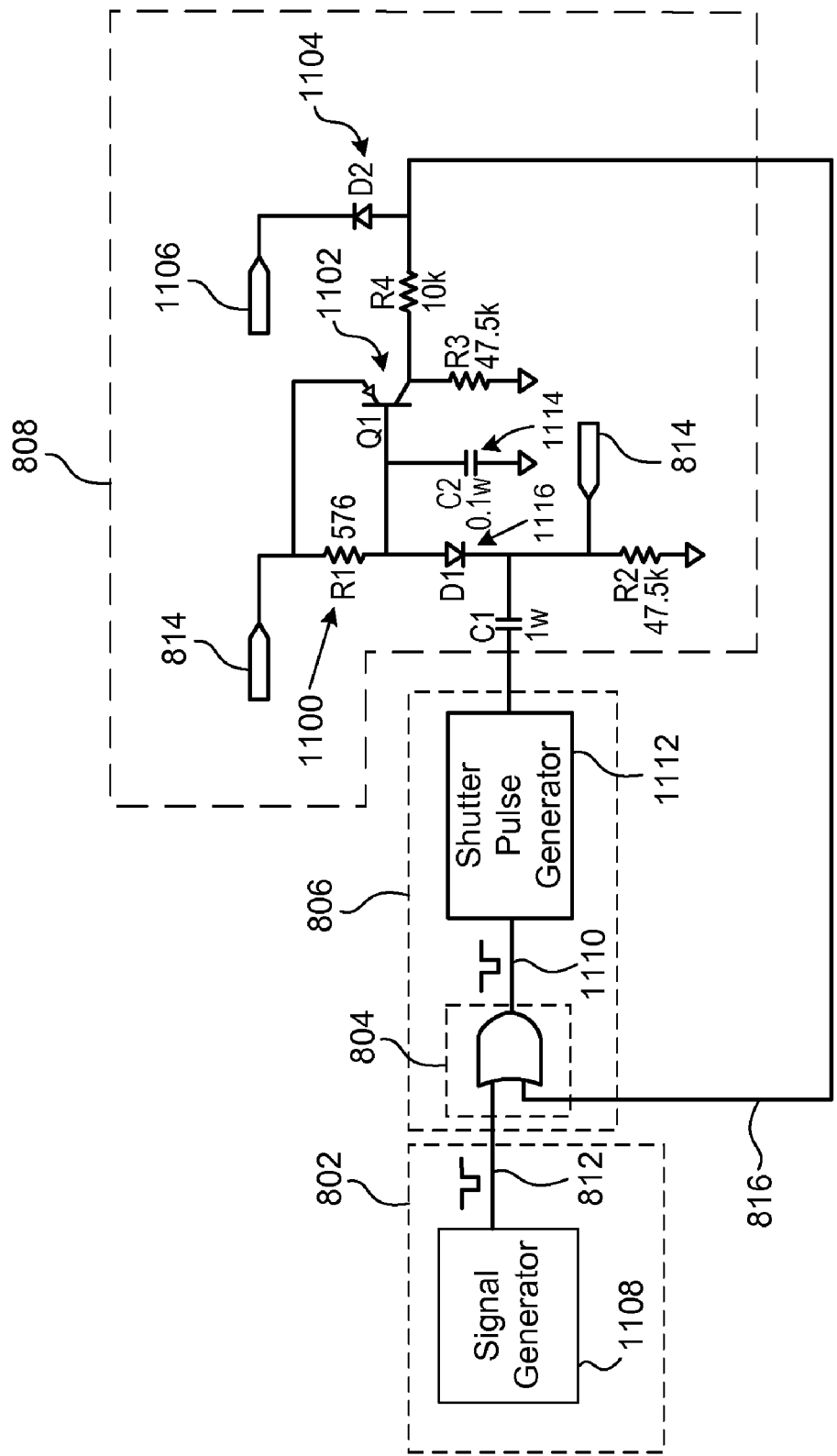
FIG. 12 is a second exemplary block and circuit diagram of blocks 802, 804, 806, and 808 shown in FIG. 8 in an embodiment in accordance with the invention.

Selector component 804 can be implemented as a separate component, integrated within timing generator component 802 (see FIG. 11), or integrated within electronic shutter pulse driver component 806 (see FIG. 12). Additionally, timing generator component 802, selector component 804, electronic shutter pulse driver component 806, and current sensing component 808, either individually or in various combinations thereof, can be included with image sensor 206 as a monolithic integrated circuit. Alternatively, timing generator component 802, selector component 804, electronic shutter pulse driver component 806, current sensing component 808, and image sensor 206, either individually or in various combinations thereof, can be implemented in an image capture device as two or more separate integrated circuits.

Figure 9:
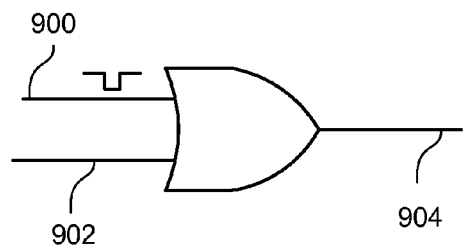
FIG. 9 illustrates a first exemplary selector component 804 shown in FIG. 8 in an embodiment in accordance with the invention.

FIG. 9 illustrates a first exemplary selector component 804 shown in FIG. 8 in an embodiment in accordance with the invention. Selector component 804 is implemented as a logic OR gate in the illustrated embodiment. The OR gate receives the drive pulse signal on input line 900 and the alert signal on input line 902. The drive pulse signal is received by the electronic shutter pulse driver component only when the alert signal is in a low (or off) state. The OR gate does not transmit the drive pulse signal to the electronic shutter pulse driver component when the alert signal is high (or on).

Figure 10:
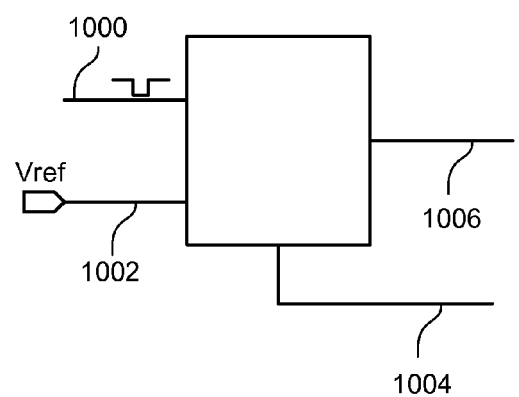
FIG. 10 depicts a second exemplary selector component 804 shown in FIG. 8 in an embodiment in accordance with the invention.

Referring now to FIG. 10, there is shown a second exemplary selector component 804 shown in FIG. 8 in an embodiment in accordance with the invention. Selector component 804 is implemented as a switch, such as a multiplexer circuit, in the illustrated embodiment. The switch receives the drive pulse signal on input line 1000 and a reference signal on input line 1002. The reference signal has a constant signal level in one embodiment in accordance with the invention.

The alert signal is received by the switch on select line 1004. The state of the alert signal is used to select either the drive pulse signal or the reference signal as the output signal for line 1006. By way of example only, the switch transmits the drive pulse signal to the electronic shutter pulse driver component when the alert signal is in a low (or off) state. The switch produces the reference signal on output line 1006 when the alert signal is high (or on).

FIG. 11 is a first exemplary block and circuit diagram of blocks 802, 804, 806, and 808 shown in FIG. 8 in an embodiment in accordance with the invention. The exemplary embodiment depicts specific component types and values, and is described with particular signal levels. Those skilled in the art will recognize that different component types, component values, or signal levels can be implemented in other embodiments in accordance with the invention.

Additionally, the embodiment of FIG. 11 uses a threshold current level of approximately 1 milliamp (mA) over a range of voltages 8 to 14 volts (average of 11 volts). The threshold current level is based on the size of the image sensor in embodiments in accordance with the invention. Larger image sensors can require a higher threshold current level while smaller image sensors a lower threshold current level. The threshold current level is set to a level just below a current level that corresponds to a damage-causing light level in an embodiment in accordance with the invention.

Current sensing component 808 senses the current level in the electronic shutter layer on line 814. When the current flowing through resistor 1100 is less than 1 mA, transistor 1102 (Q1) is turned off and the alert signal on line 816 is in a first state (e.g., a low state). When the current flowing through resistor 1100 (R1) substantially equals or is greater than 1 mA, transistor 1102 (Q1) turns on and pulls the alert signal on line 816 to a second state (e.g., a high state). Diode 1104 (D2) clamps the state of the alert signal to potential 1106. In the embodiment shown in FIG. 11, potential 1106 is the logic power supply high for selector component 804 (OR gate logic power supply high).

Selector component 804 is integrated within timing generator component 802 in the illustrated embodiment. When an electronic shutter operation is to be performed, signal generator 1108 in timing generator component 802 produces the drive pulse signal on line 812. When the alert signal on line 816 is at a low state, the drive pulse signal is output by selector component 804 on line 1110 and received by electronic shutter pulse driver component 806. Shutter pulse generator 1112 in electronic shutter pulse driver component 806 changes a signal level of a shutter signal from a first level to a second level in response to receiving the drive pulse signal. The shutter signal is transmitted to the electronic shutter layer in the image sensor on line 814 and an electronic shutter operation is performed. Any coupling of the shutter signal is filtered out by capacitor 1114 through diode 1116 (D1).

When the current level on line 814 equals or exceeds the threshold current level, current sensing component 808 changes the state of the alert signal to a high state. Selector component 804 does not transmit the drive pulse signal to electronic shutter pulse driver component 806 when the state of the alert signal is high. An electronic shutter operation is not performed when the drive pulse signal is not received by electronic shutter pulse driver component 806. The signal level of the shutter signal on line 814 remains at the first level and is not changed to the second level.

FIG. 12 depicts a second exemplary block and circuit diagram of blocks 802, 804, 806, and 808 shown in FIG. 8 in an embodiment in accordance with the invention. The function and structure of the FIG. 12 embodiment is similar to the FIG. 11 embodiment, except that selector component 804 is integrated within electronic shutter pulse driver component 806.

Figure 13:
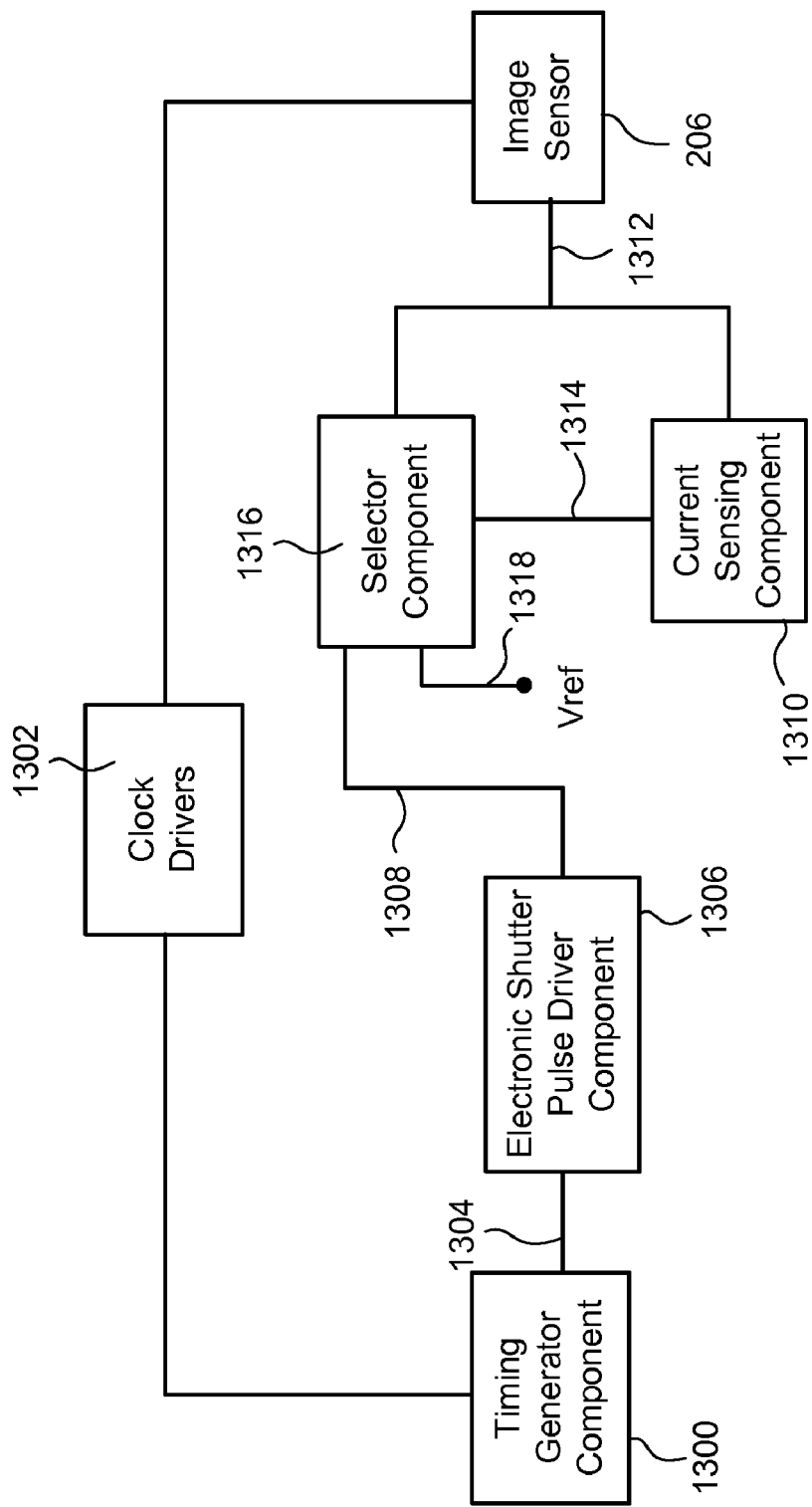
FIG. 13 is a block diagram of a second control circuit suitable for use with image sensor 206 in an embodiment in accordance with the invention.

Referring now to FIG. 13, there is shown a block diagram of a second control circuit suitable for use with image sensor 206 in an embodiment in accordance with the invention. Timing generator component 1300 produces timing signals for the image sensor 206. For example, timing generator component 1300 generates timing signals that control the state of vertical and horizontal CCD clock drivers 1302 connected to image sensor 206.

Timing generator 1300 also produces a drive pulse signal on line 1304 when an electronic shutter operation is to be performed in image sensor 206. The drive pulse signal is received by electronic shutter pulse driver 1306. Electronic shutter pulse driver component 1306 changes a signal level of a shutter signal on line 1308 from a first level to a second level in response to receiving the drive pulse signal.

Current sensing component 1310 senses a current level in the electronic shutter layer in image sensor 206 on line 1312. If image sensor 206 is exposed to damaging bright light, a large photocurrent can be present on line 1312. When the current on line 1312 equals or exceeds a threshold current level, current sensing component 1310 changes a state of an alert signal on line 1314.

Selector component 1316 receives the alert signal on line 1314, the drive pulse signal on line 1308, and a reference signal on line 1318. Selector component 1316 is implemented as a switch, such as a multiplexer, in an embodiment in accordance with the invention. Based on the state of the alert signal on line 1314, selector component 1316 either transmits, or does not transmit, the shutter signal to the electronic shutter layer in image sensor 206. For example, selector component 1316 transmits the shutter signal to the electronic shutter layer when the state of the alert signal is at the first (e.g., low or off) state. An electronic shutter operation is performed when the shutter signal is received by the electronic shutter layer in image sensor 206. Selector component 1316 does not transmits the shutter signal to the electronic shutter layer when the state of the alert signal is at the second (e.g., high or on) state. Instead, in the illustrated embodiment, selector component 1316 transmits the reference signal to the electronic shutter layer. An electronic shutter operation is not performed when the reference signal is received by the electronic shutter layer in image sensor 206. The reference signal equals, or substantially equals, the first level of the shutter signal in an embodiment in accordance with the invention. Different signal levels can be used for the reference signal in other embodiments in accordance with the invention.

Selector component 1316 can be implemented as a separate component, integrated within electronic shutter pulse driver component 1306, or integrated within current sensing component 1310. Additionally, timing generator component 1300, electronic shutter pulse driver component 1306, selector component 1316, and current sensing component 1310, either individually or in various combinations thereof, can be included with image sensor 206 as a monolithic integrated circuit. Alternatively, timing generator component 1300, selector component 1316, electronic shutter pulse driver component 1306, current sensing component 1310, and image sensor 206, either individually or in various combinations thereof, can be implemented in an image capture device as two or more separate integrated circuits.

Figure 14:
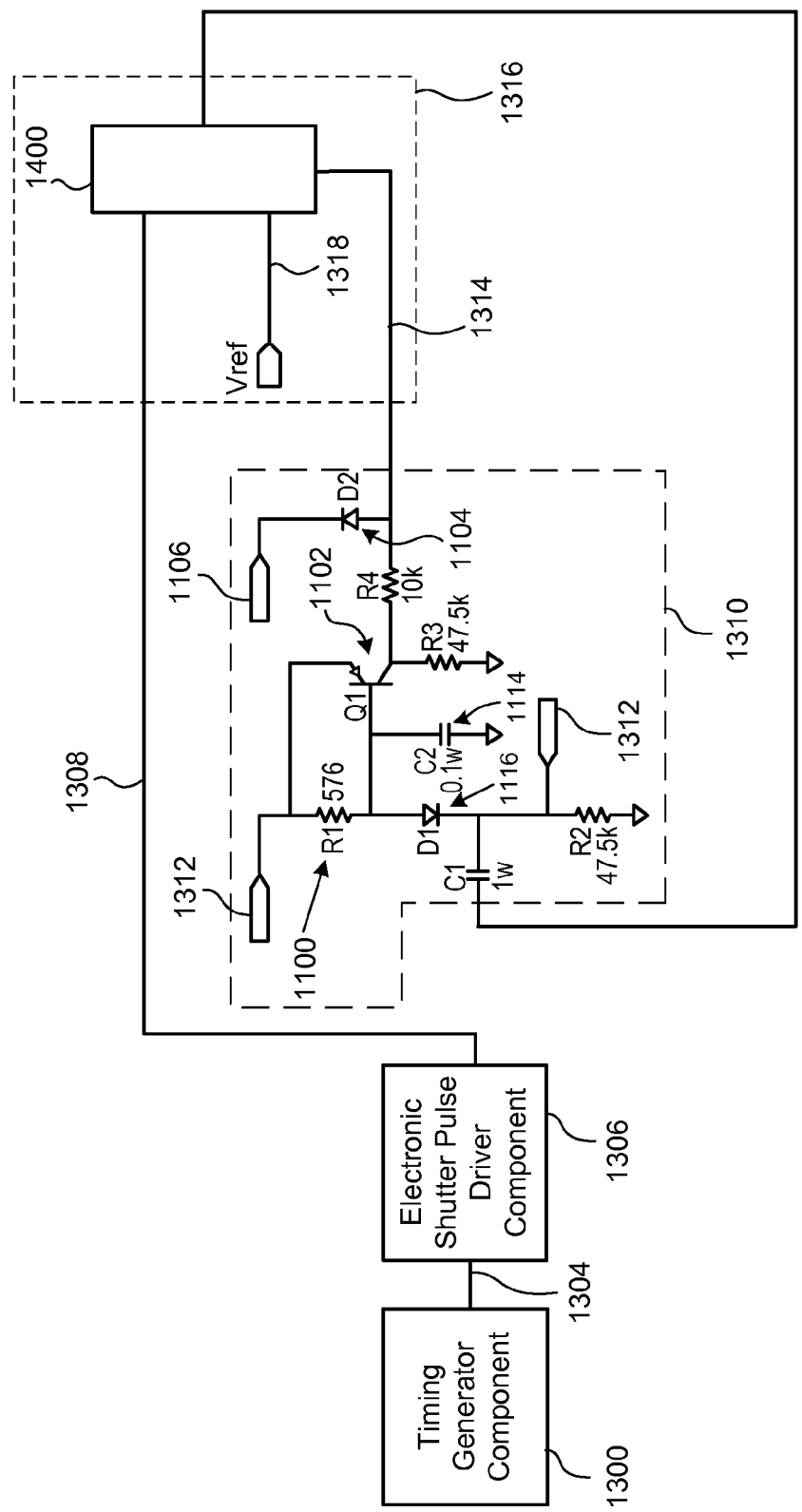
FIG. 14 is an exemplary block and circuit diagram of blocks 1300, 1306, 1310, and 1316 shown in FIG. 13 in an embodiment in accordance with the invention.

FIG. 14 depicts an exemplary block and circuit diagram of blocks 1300, 1306, 1310, and 1316 shown in FIG. 13 in an embodiment in accordance with the invention. In the illustrated embodiment, selector component 1316 is implemented as a switch 1400. One example of a switch is a multiplexer. Switch 1400 receives the shutter signal produced by electronic shutter pulse driver component 1306 on input line 1308 and a reference signal on input line 1318. Output line 1312 is electrically connected to the contact to the electronic shutter layer (e.g. contact 414 in FIG. 4 and contact 504 in FIG. 5).

Current sensing component 1310 operates similarly to current sensing component 808 shown in FIG. 8 in an embodiment in accordance with the invention. The alert signal produced by current sensing component 1310 on line 1314 is received by switch 1400. Based on the state of the alert signal, switch 1400 transmits either the shutter signal or the reference signal to the electronic shutter layer on line 1312. By way of example only, switch 1400 outputs the shutter signal when the alert signal is in a low (or off) state and outputs the reference signal when the alert signal is in a high (or on) state. An electronic shutter operation is performed when the contact to the electronic shutter layer in image sensor 206 receives the shutter signal. An electronic shutter operation is not performed when the contact to the electronic shutter layer in image sensor 206 receives the reference signal in an embodiment in accordance with the invention.

Figure 15:
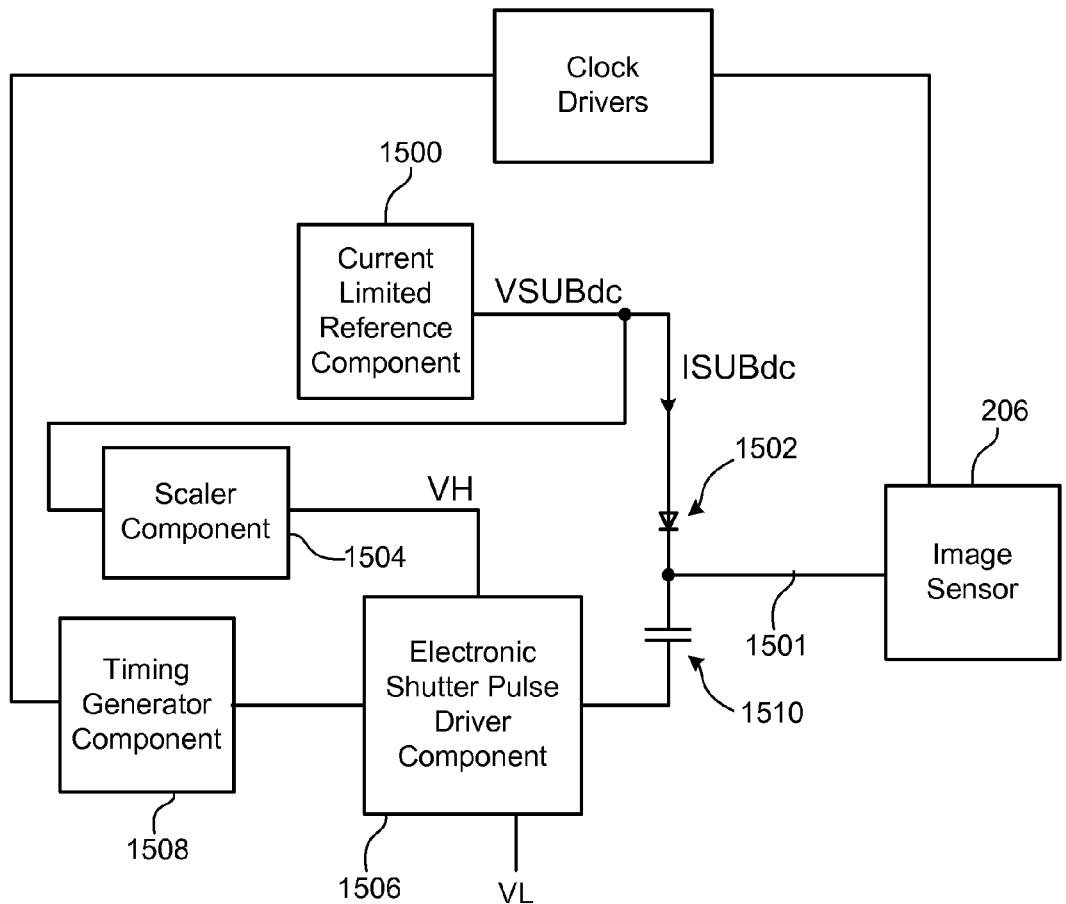
FIG. 15 is a block diagram of a third control circuit suitable for use with image sensor 206 in an embodiment in accordance with the invention.

Referring now to FIG. 15, there is shown a block diagram of a third control circuit suitable for use with image sensor 206 in an embodiment in accordance with the invention. A current limited reference component 1500 outputs a DC voltage signal (VSUBdc) that is transmitted to image sensor 206 through diode 1502. VSUBdc provides a DC voltage signal on line 1501 that is received by the electronic shutter layer in image sensor 206. Current limited reference component 1500 has a transfer characteristic such that its output voltage is constant as its load current ISUBdc varies from zero to a threshold current level ILIMIT.

Electronic shutter pulse driver component 1506 produces a shutter signal that has a first level when the photosensitive regions in image sensor 206. The first level is the same as the DC voltage produced by current limited reference component 1500 in an embodiment in accordance with the invention. By way of example only, the first level can be between three and twelve volts.

When an electronic shutter operation is to be performed, timing generator 1508 transmits a drive pulse signal to electronic shutter pulse driver component. The drive pulse signal, when received by electronic shutter pulse driver component 1506, causes electronic shutter pulse driver component 1506 to change the signal level of the shutter signal from a first level to a second level. Capacitor 1510 adds the increased voltage to the signal on line 1501 that is received by the electronic shutter layer in image sensor 206.

Figure 16:
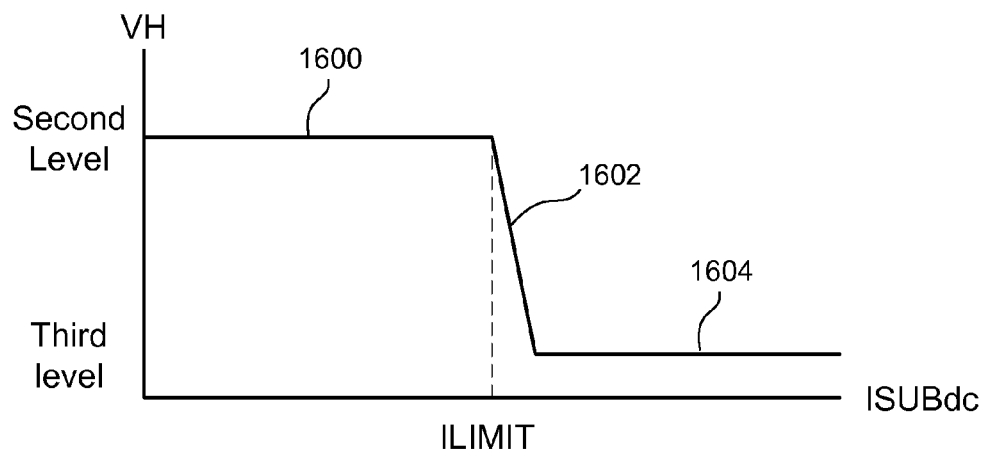
FIG. 16 is an exemplary plot of the signal VH shown in FIG. 15.

Scaler component 1504 receives VSUBdc and produces a high voltage signal (VH) having a first signal level (see plot 1600 in FIG. 16). The voltage signal VH is received by electronic shutter pulse driver component 1506. The voltage signal VH can be defined by the equation:

$$VH = a \times VSUBdc + b$$

In one embodiment in accordance with the invention, the values for variables "a" and "b" are determined such that the signal level of signal VH is equal to the desired second level for the shutter signal for an electronic shutter operation when ISUBdc is below ILIMIT. By way of example only, the second level for the shutter signal is between twenty and thirty volts.

When the load current ISUBdc in the electronic shutter layer exceeds the threshold current level ILIMIT, scaler component 1504 scales the level of signal VH to a different second level. Electronic shutter pulse driver component 1506 reduces the signal level of the shutter signal to a third level in response to receiving the scaled VH signal. The signal level of the shutter signal decreases to the third level when the load current ISUBdc exceeds the threshold current level ILIMIT. The third level can be the same as the first level or the third level can be between the first and second levels.

The electronic shutter operation is not performed when electronic shutter pulse driver component 1506 receives the scaled VH signal. In the illustrated embodiment, the signal level of signal VH rapidly decreases (see plot 1602 in FIG. 16) to the second level (see plot 1604 in FIG. 16). The rapid decrease of signal VH protects image sensor 206 from damage under high light conditions.

When the load current ISUBdc in the electronic shutter layer does not exceed the threshold current level ILIMIT, scaler component 1504 transmits the VH signal at the first level to electronic shutter pulse driver component. Note that output of current limited reference component 1500 has the same function form as FIG. 16. Scaler component 1504 scales the signal to the larger voltages needed for electronic shuttering. Electronic shutter pulse driver component 1506 outputs the shutter signal at the second level and an electronic shutter operation is performed in image sensor 206.

Electronic shutter pulse driver component 1506 is designed so that VH is greater than VL in an embodiment in accordance with the invention. The electronic shutter drive circuits in image sensor 206 are protected from damage when ILIMIT is exceeded because VH is decreased to a safe value by scaler component 1504. Alternatively, scaler component 1504 can be designed so that VH is greater than VL to protect the electronic shutter driver circuits in other embodiments in accordance with the invention.

The timing generator, electronic shutter pulse driver component 1506, scaler component 1504, and current reference component 1500, either individually or in various combinations thereof, can be included with image sensor 206 as a monolithic integrated circuit. Alternatively, the timing generator, electronic shutter pulse driver component 1506, scaler component 1504, current reference component 1500, and image sensor 206, either individually or in various combinations thereof, can be implemented in an image capture device as two or more separate integrated circuits.

The invention has been described in detail with particular reference to certain preferred embodiments thereof, but it will be understood that variations and modifications can be effected within the spirit and scope of the invention. Additionally, even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

PARTS LIST 200 image capture device
202 light
204 imaging stage
206 image sensor
208 processor
210 memory
212 display
214 other input/output (I/O)
300 image sensor
302 pixel
304 imaging area
306 photosensitive region
308 charge
310 vertical charge-coupled device shift register
312 shift element
314 shift element
316 horizontal charge-coupled device shift register
318 output circuit
400 substrate
402 well
404 shift element in vertical charge-coupled device shift register
406 gate
408 light shield
410 vertical overflow drain
412 pinning layer
414 contact
500 buried layer
502 substrate
504 contact
800 shutter control circuit
802 timing generator component
804 selector component
806 electronic shutter pulse driver component
808 current sensing component
810 clock drivers
812 signal line
814 signal line
816 signal line
900 input line
902 input line
904 output line
1000 input line
1002 input line
1004 select line
1006 output line
1100 resistor
1102 transistor
1104 diode
1106 potential
1108 signal generator
1110 signal line
1112 shutter pulse generator
1114 capacitor
1116 diode
1300 timing generator component
1302 clock drivers
1304 signal line
1306 electronic shutter pulse driver component
1308 signal line
1310 current sensing component
1312 signal line
1314 signal line
1316 selector component
1318 signal line
1400 switch
1500 current reference component
1501 signal line
1502 diode
1504 scaler component
1506 electronic shutter pulse driver component
1508 timing generator
1510 capacitor
1600 plot
1602 plot
1604 plot

The invention claimed is:

1. A method for operating an image sensor that includes an electronic shutter layer and a contact to the electronic shutter layer, the method comprising:
prior to performing an electronic shutter operation, determining whether a current level in the electronic shutter layer exceeds a threshold current level; and
when the current level in the electronic shutter layer exceeds the threshold current level, not performing the electronic shutter operation.

2. The method as in claim 1, further comprising performing the electronic shutter operation when the current level in the electronic shutter layer does not exceed the threshold current level.

3. The method as in claim 1, further comprising performing the electronic shutter operation when the current level in the electronic shutter layer equals the threshold current level.

4. The method as in claim 2, further comprising:
setting a state of an alert signal to a first state when the current level in the electronic shutter layer does not exceed the threshold current level;
setting a state of an alert signal to a second state when the current level in the electronic shutter layer exceeds the threshold current level;
transmitting a drive pulse signal to an electronic shutter pulse driver component when the state of the alert signal is at the first state to cause the electronic shutter operation to be performed; and
not transmitting the drive pulse signal to the electronic shutter pulse driver component when the state of the alert signal is at the second state to cause the electronic shutter operation to not be performed.

5. The method as in claim 4, wherein transmitting a drive pulse signal to an electronic shutter pulse driver component when the state of the alert signal is at the first state causes a signal level of a shutter signal to be changed from a first level to a second level for the electronic shutter operation.

6. The method as in claim 4, wherein not transmitting the drive pulse signal to the electronic shutter pulse driver component when the state of the alert signal is at the second state causes a signal level of a shutter signal to not be changed from a first level to a second level to not perform the electronic shutter operation.

7. The method as in claim 2, wherein performing the electronic shutter operation comprises changing a signal level of a shutter signal from a first level to a second level.

8. The method as in claim 7, wherein not performing the electronic shutter operation comprises not changing the signal level of the shutter signal to the second level.

9. The method as in claim 8, further comprising changing the signal level of the shutter signal to a third level.

10. The method as in claim 8, further comprising scaling the signal level of the shutter signal to a third level.

* * * * *